United States Patent [19]
Ode

[11] Patent Number: 4,969,317
[45] Date of Patent: Nov. 13, 1990

[54] ANIMAL HAT APPARATUS AND METHOD

[76] Inventor: April Ode, 1510 Catherine Dr., Lake Havasu City, Ariz. 86403

[21] Appl. No.: 342,167

[22] Filed: Apr. 24, 1989

Related U.S. Application Data

[63] Continuation-in-part of Ser. No. 211,048, Jun. 24, 1988, abandoned.

[51] Int. Cl.⁵ ............................................. B68C 5/00
[52] U.S. Cl. ..................................................... 54/80
[58] Field of Search ...................... 54/80; 2/171.2, 177

[56] References Cited

U.S. PATENT DOCUMENTS

| | | | |
|---|---|---|---|
| 58,081 | 9/1866 | Elveena | 54/80 |
| 743,704 | 11/1903 | Flynn | 54/80 |
| 1,114,678 | 10/1914 | Budai | 54/80 |
| 1,425,676 | 8/1922 | Naudulaitis | 54/80 |

*Primary Examiner*—Robert P. Swiatek
*Attorney, Agent, or Firm*—Harry M. Weiss

[57] ABSTRACT

A hat apparatus to protect a four-legged animal from extreme heat and direct sunlight. The hat comprises a head covering section, a brim section to protect the animal's eyes, face, ears and rear neck from sunlight, and a chin strap to attach to the chin or bottom portion of the head of the animal. Preferably, the animal hat is used for dogs. The head covering section has an enclosed cavity having a liquid absorbable material for absorbing, for example, cold water in order to provide a cool hat apparatus for the animal. The head covering section has a top portion with a top liner, a right side portion with a right liner, a left side portion with a left liner, a front portion with a front liner and a rear portion with a rear liner. The liners are made of a substantially leak proof material and are stitched together to enclose the cavity. The head covering section also has a bottom portion having openable opposite pieces with strip connectors for filling the cavity with the cold water. The bottom portion permits some seepage therethrough in a downward direction to the top of the animal's head where the liquid can evaporated and cool the animal's head.

7 Claims, 1 Drawing Sheet

U.S. Patent  Nov. 13, 1990  4,969,317
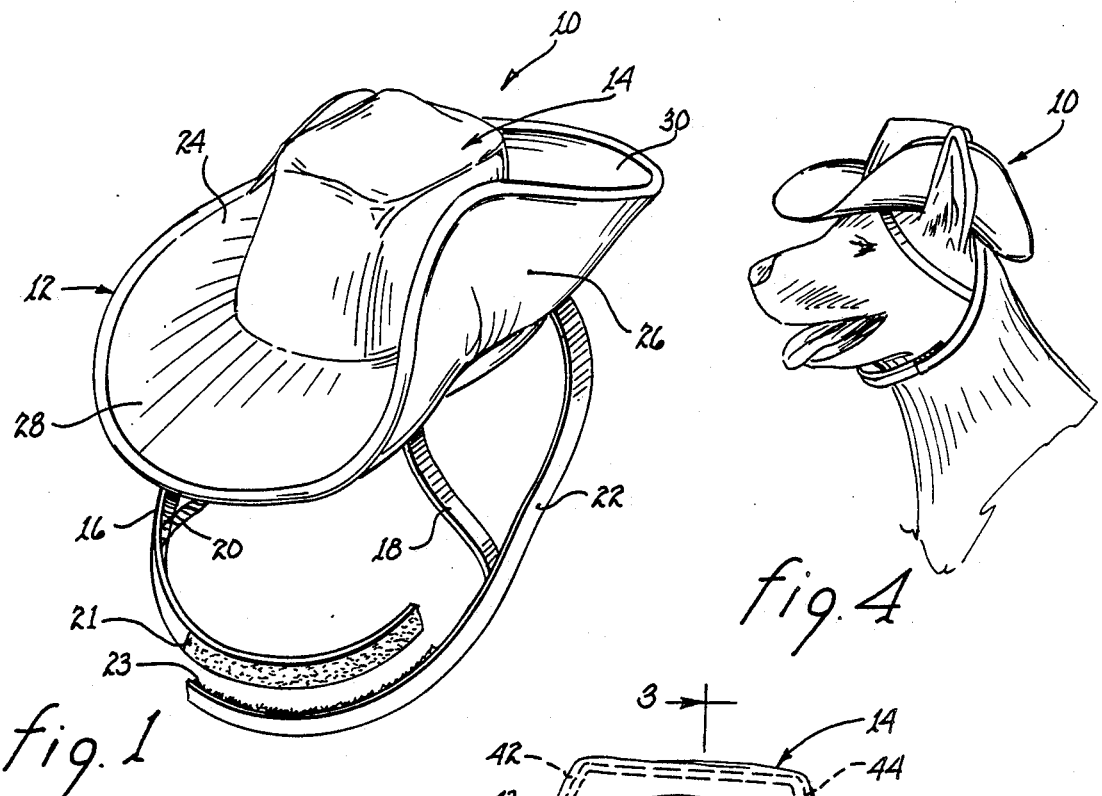
fig. 1
fig. 4
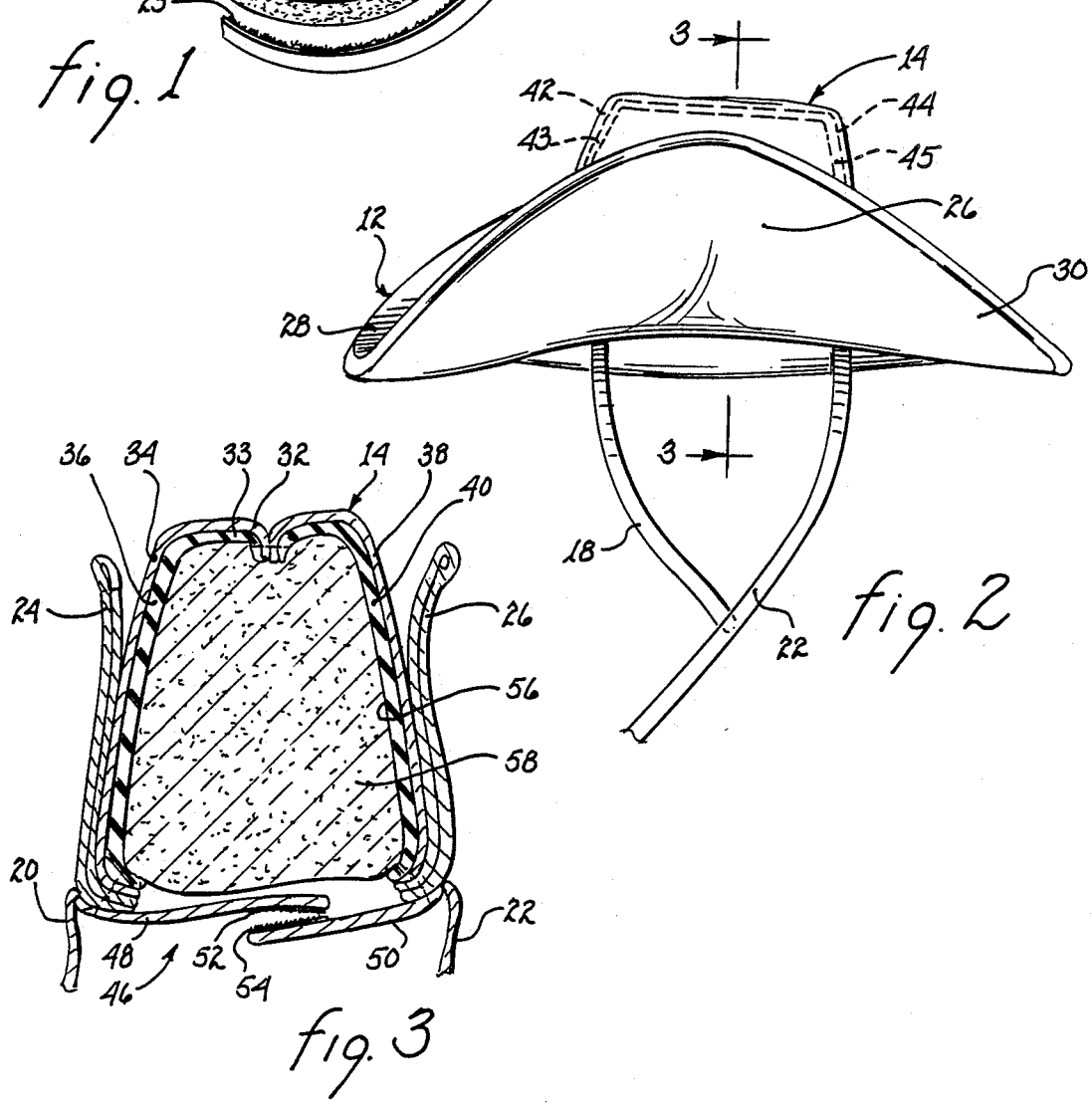
fig. 2
fig. 3

ANIMAL HAT APPARATUS AND METHOD

BACKGROUND OF THE INVENTION

Cross Reference to Earlier Filed Application

This application is a continuation-in-part patent application of parent patent application Ser. No. 211,048 filed June 24, 1988, and now abandoned.

FIELD OF THE INVENTION

The present invention generally relates to a head covering and ear, eye and rear neck protection apparatus and method for four legged animals and, more specifically, to a hat apparatus and method for any four-legged animal which keeps the animal such as a dog cool in hot weather and protects their skin, ears, eyes and rear neck from conditions of extreme heat and direct sunlight.

Description of the Prior Art

During periods of hot weather and/or bright sunlight, many dogs and other four-legged animals are in extreme heat and direct sunlight conditions for most of the day since they are usually in the outdoors. As a result, these animals often overheat. Also, sunlight is harmful for animals' eyes, as they have no means to protect themselves from harmful ultraviolet rays.

The prior art apparatus, which is described in the aforementioned patent application, and which has a baseball cap type of shape, includes a head covering section; an eye protection section; a right ear aperture; a left ear aperture; a right lower chin strap and a left lower chin strap; wherein the head covering section has a top layer and a bottom layer and a liquid absorbing material layer disposed between the top layer and the bottom layer.

One problem with the prior art apparatus is that the volume of liquid in the liquid absorbing material is relatively small so that the animal is kept comfortable for a relatively short period of time.

SUMMARY OF THE INVENTION

It is an object of this invention to provide a head covering and ear, eye, and rear neck protection apparatus and method for keeping animals at a comfortable and healthy temperature, over a relatively long period of time.

It is a further object of this invention to provide a head covering and ear, eye, and rear neck protection apparatus and method for protecting animal's ears, eyes and rear neck from direct sunlight.

It is a still further object of this invention to provide a head covering and ear, eye and rear neck protection apparatus and method for protecting dogs with skin problems from the harmful effects of the sun.

It is still another object of this invention to provide a head covering and ear, eye and rear neck protection apparatus and method for protecting horses and other four-legged animals from the same dangers, using the same invention as adapted for that animal.

It is another object to provide a head covering and ear, eye and rear neck protection apparatus and method for protecting dogs and other four-legged animals of all sizes and breeds from these dangers.

The aforementioned and other objects are accomplished, according to the present invention, by an adjustable, varying sized hat comprised of a head covering section having an enclosed cavity having an absorbent insulating material which contains a cold fluid, and comprised of a brim section having a front portion extending over the animal's face and eyes, and having respective right ear and left ear protection portions and having a rear neck protection portion. The brim section comprises front and rear portions made of rigid material.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 1 is a perspective view of the hat apparatus of this invention.

FIG. 2 is a left side elevation view of the hat apparatus of FIG. 1.

FIG. 3 is a cross-sectional view, taken along line 3—3 of FIG. 2.

FIG. 4 is a view of the hat as, for example, worn by a pointed-eared or any ear-up breed of dog.

DESCRIPTION OF THE PREFERRED EMBODIMENT

Referring now to FIG. 1 of the accompanying drawings which set forth the present invention in greater detail and in which like numerals designate like features, a animal (i.e. dog) hat apparatus 10, which has the shape of a cowboy hat, is shown. Apparatus 10 is generally comprised of a brim section 12, a head covering section 14, a right ear strap 16 (see FIG. 1), a left ear strap 18, a right lower chin strap 20, and a left lower chin strap 22. Straps 20, 22 have respective strip connections 21, 23.

As shown in FIGS. 1 and 2, brim section 12 includes a right ear protection portion 24, a left ear protection portion 26, and an eye and face protection portion 28, and a rear neck protection portion 30.

As shown in FIG. 3, head covering section 14 includes a stitched top portion 32 with a top liner 33, a right side portion 34 with a right liner 36, and a left side portion 38 with a left liner 40. Section 14 also has a front portion 42 with a front liner 43 (FIG. 2), and a rear portion 44 with a rear liner 45 (FIG. 2). Section 14 also has a bottom portion 46, which has a bottom right side piece 48 and a bottom left side piece 50. Right piece 48 has a right connector 52. Left piece 50 has a left connector 54.

Connectors 21, 23, 52, 54 are connector strips, such as the connector strips which are sold under the Trademark VELCRO.

Section 14, with its stitched portions 32, 34, 38, 42, 44, 48, 50, encloses a cavity or reservoir or chamber 56. Cavity 56 contains a sponge-like, liquid absorbable material 58, which contains a liquid (not shown). Stitched liners 33, 36, 40, 43, 45 are composed of a relatively leak proof material.

The liquid tends to seep downwardly through pieces 48, 50, thereby depositing some liquid on the top of the animal's head. Evaporation of such liquid tends to cool the animal's head.

The liquid within cavity 56 and absorbing material 58 has a relatively larger volume than the corresponding volume of the liquid in the prior art hat apparatus so that such liquid within cavity 56 remains relatively cooler and lasts relatively longer. Thus, the animal can remain outdoors without overheating for a relatively longer period of time when wearing the hat apparatus 10, as compared to when wearing the prior art hat apparatus.

Liners 33, 36, 40, 43, 45 minimize any seepage of liquid or vapor upwardly away from the animal's head. Any wastage of liquid is thereby minimized.

Portions 48, 50 permit seepage of liquid or vapor downwardly towards and into contact with the animal's head. Portions 48, 50 remain relatively cool because some liquid is within cavity 56 and is in portions 48, 50.

Portion 28 protects the eyes and face of the animal from the direct sunlight. Portions 24, 26 protect the ears of the animal, particularly the back of the ears. Portion 30 protects the rear neck of the animal.

When filling cavity 56, apparatus 10 is placed upside-down on a support. Connectors 52, 54 and pieces 48, 50 are separated. Liquid is poured into cavity 56 and over material 58. Then connectors 52, 54 and pieces 48, 50 are closed.

As best shown in FIG. 4, the animal hat 10 can accommodate an animal with pointed ears. The animal hat 10 can also accommodate an animal with floppy ears. The hat 10 can be constructed in a plurality of sizes to fit any size or breed of animal.

The material covering the brim section 12 and the head covering section 14 can be a fabric of any print, patter, color, or texture, as desired. The material of the liners is a relatively leak proof material such as a relatively thick material to minimize seepage into the outer fabric.

While the invention has been particularly shown and described in reference to the preferred embodiments thereof, it will be understood by those skilled in the art that changes in form and details may be made without departing from the spirit and scope of the invention.

I claim:

1. A method for protecting a four-legged animal from heat and sunlight comprising the steps of:
    providing a head covering section having relatively leak proof front, rear, top, left side and right side portions;
    providing a brim section having front, rear, right side and left side portions attached to said head covering section;
    providing an enclosed cavity within said head covering section;
    providing a bottom portion of said head covering section having separable opposite pieces with respective connectors;
    providing a chin strap attached to said head covering section; and thereafter
    locating said bottom portion of said head covering section on top of the animal's head;
    securing said chin strap under the animal's chin;
    providing said cavity of said head covering section with a liquid absorbable material,
    depositing a cold liquid into said cavity of said head covering section through an opening between said pieces of said bottom portion; and then closing said opening before locating said bottom portion of said head covering section on top of the animal's head.

2. The method of claim 1 wherein said liquid absorbable material is sponge-like.

3. The method of claim 1 wherein said head covering section and said brim section providing a cowboy hat type configuration.

4. An animal hat apparatus to protect the head of a four-legged animal from heat and sunlight comprising, in combination:
    a head covering section having an internal cavity extending from the top to the bottom of said head covering section;
    an interior liner located at the top and along the sides of said internal cavity; and
    water absorbing means filling all of said internal cavity for prolonged cooling of the head of said animal.

5. The apparatus of claim 4 wherein said water absorbing means is a sponge-like material in contact with the entire interior surface of said interior liner.

6. The apparatus of claim 4 wherein said sponge-like material is saturated with water.

7. The apparatus of claim 6 wherein said head covering section having a brim section attached thereto, said head covering section and said brim section having a cowboy hat type configuration.

* * * * *